Oct. 22, 1935.   J. KUCHAR   2,018,269
FLUID PRESSURE MECHANISM
Filed May 6, 1932   7 Sheets-Sheet 1

Fig. 1.

Inventor
Joseph Kuchar
By Williams,
Bradbury, McCaleb
& Hinkle Attys.

Oct. 22, 1935.　　　　J. KUCHAR　　　　2,018,269
FLUID PRESSURE MECHANISM
Filed May 6, 1932　　　7 Sheets-Sheet 3

Oct. 22, 1935.    J. KUCHAR    2,018,269
FLUID PRESSURE MECHANISM
Filed May 6, 1932    7 Sheets-Sheet 6

Inventor
Joseph Kuchar
By Williams,
Bradbury,
McCaleb & Hinkle
Attys.

Patented Oct. 22, 1935

2,018,269

UNITED STATES PATENT OFFICE 2,018,269

FLUID PRESSURE MECHANISM

Joseph Kuchar, Chicago, Ill., assignor to Athey Truss Wheel Co., Chicago, Ill., a corporation of Illinois Application May 6, 1932, Serial No. 609,603

14 Claims. (Cl. 60—52)

This invention relates to fluid pressure mechanism and particularly to such mechanism in which fluid under pressure is employed to actuate pressure operated mechanisms located at a distance. The invention will hereinafter be described in connection with one particular purpose, that is the control of door opening and closing mechanisms on a trailer from a tractor. It will, however, be understood that the invention is capable of innumerable applications and that it is not intended to limit the invention to the particular purpose described. By way of example the invention is described in connection with a liquid pressure system. It will however be understood that the invention is not limited thereto since it is capable of embodiment in forms employing air or gases as the pressure fluid.

In a hydraulic apparatus of this type the fluid is delivered under pressure, for example from a pump, and is diverted by means of valves to desired cylinders or other hydraulic devices which are actuated. When the cylinder or other device is full the liquid can no longer be supplied. Since the liquid is not compressible means must be provided for by-passing the supply, since the operator cannot be relied upon to stop the pump at the exact time in order to prevent injury to the system.

One of the objects of the invention is to provide a fluid pressure system comprising a by-pass which is automatically opened and which presents substantially no resistance to the pump.

A further object of the invention is to provide a device of the character described, comprising a pair of by-passes for the pump, one of which is adapted to open automatically upon the attainment of a predetermined pressure, the other being adapted to be opened manually and the first by-pass being adapted to be closed automatically when the second by-pass is opened.

A further object of the invention is to provide a pump and valve unit for a device of the character described which is simple in operation, easy to construct and is durable and efficient in operation.

Other objects, advantages and capabilities will appear from the following description of a preferred embodiment of the invention, taken in conjunction with the accompanying drawings, in which.

Referring to the drawings, the reference numeral 20 designates a tractor to which is hitched in suitable manner a trailer 21 which is shown as a bottom dump wagon supported on tread laying wheels 22. It is not considered necessary to go into detail regarding the construction of the wagon 21. It is sufficient to indicate that it comprises bottom doors 23 which are adapted to open downwardly when a latch is released which may be effected by supplying pressure fluid to a cylinder 24 by means of a conduit 25. These doors may in turn be elevated to closed position by means of a cylinder 26 when pressure fluid is supplied thereto through conduit 27. The two cylinders 24 and 26 are, of course, merely examples of cylinders or other pressure actuated means which may be controlled in the manner hereinafter described. For example, a train of trailers may be hitched to the tractor 20 and a ram on each trailer may be actuated from the pump and valve unit.

Figure 1:
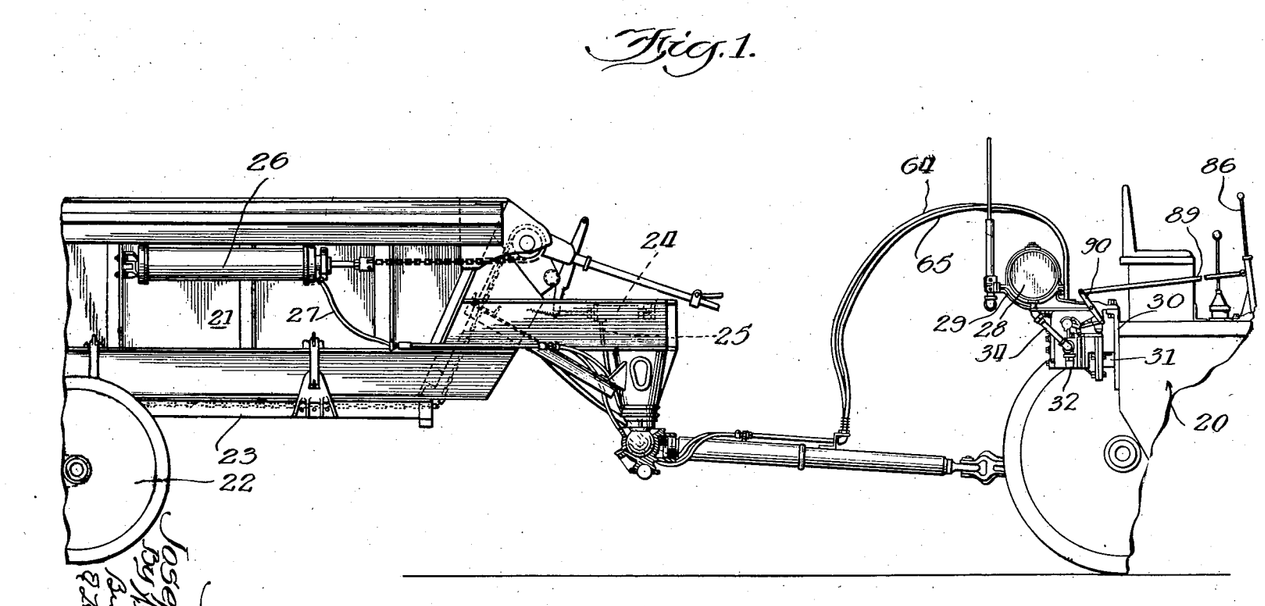
Figure 1 is a fragmentary elevation showing the rear end of a tractor and the forward end of a trailer, upon which an embodiment of the invention is installed.
Figure 2:
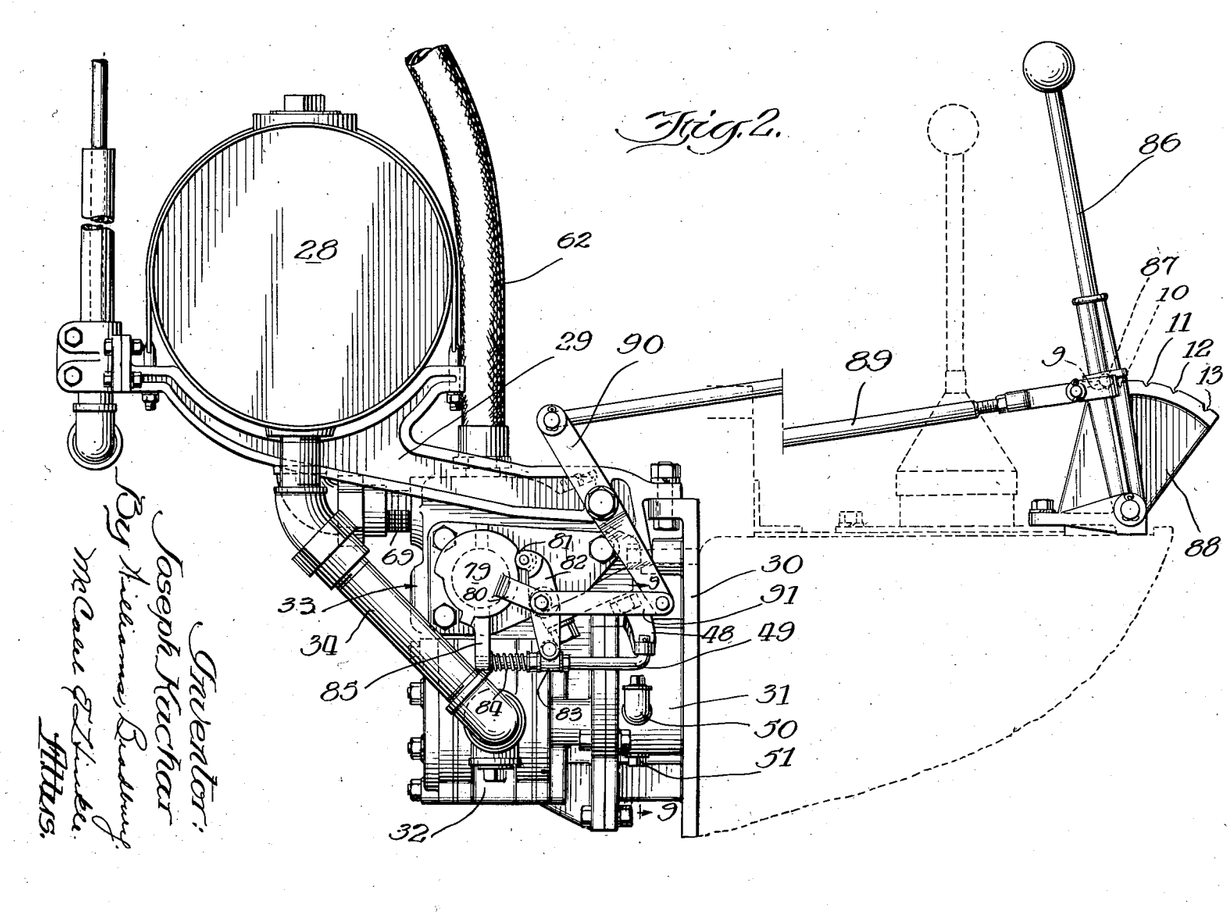
Fig. 2 is an elevational view showing the pump and valve unit, together with the control means therefor in elevation and on a substantially larger scale.
Figure 3:
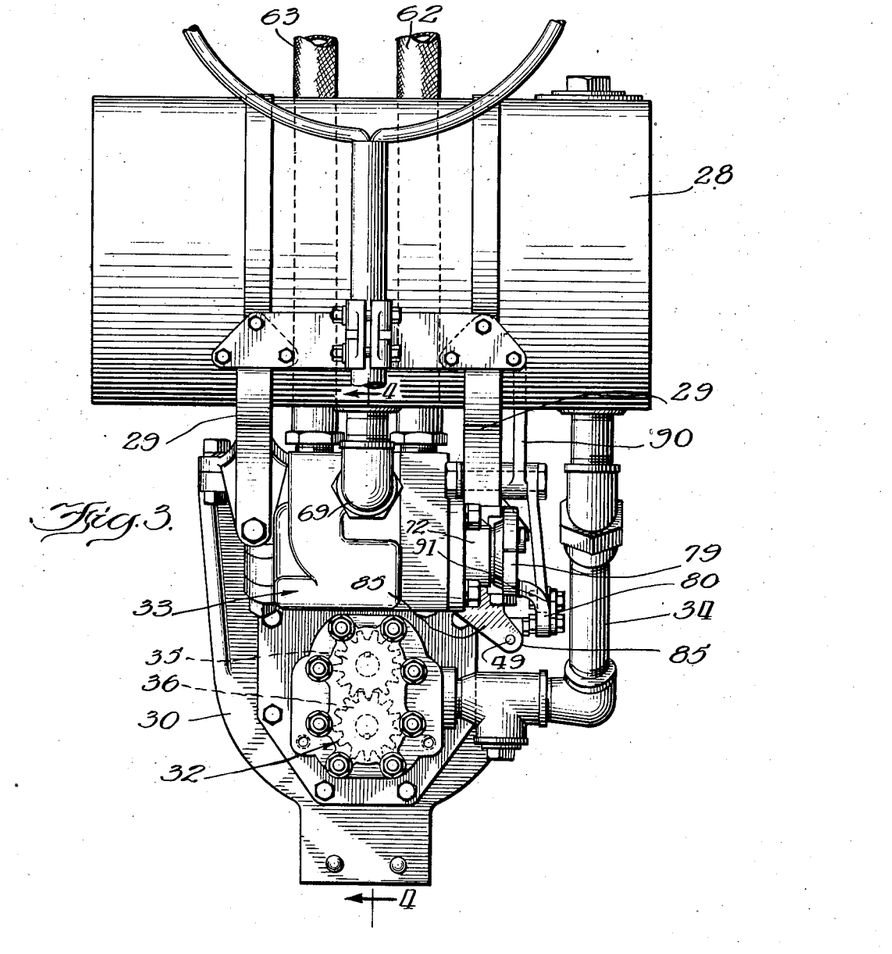
Fig. 3 is a rear view of the pump and valve unit.
Figures 4, 5:
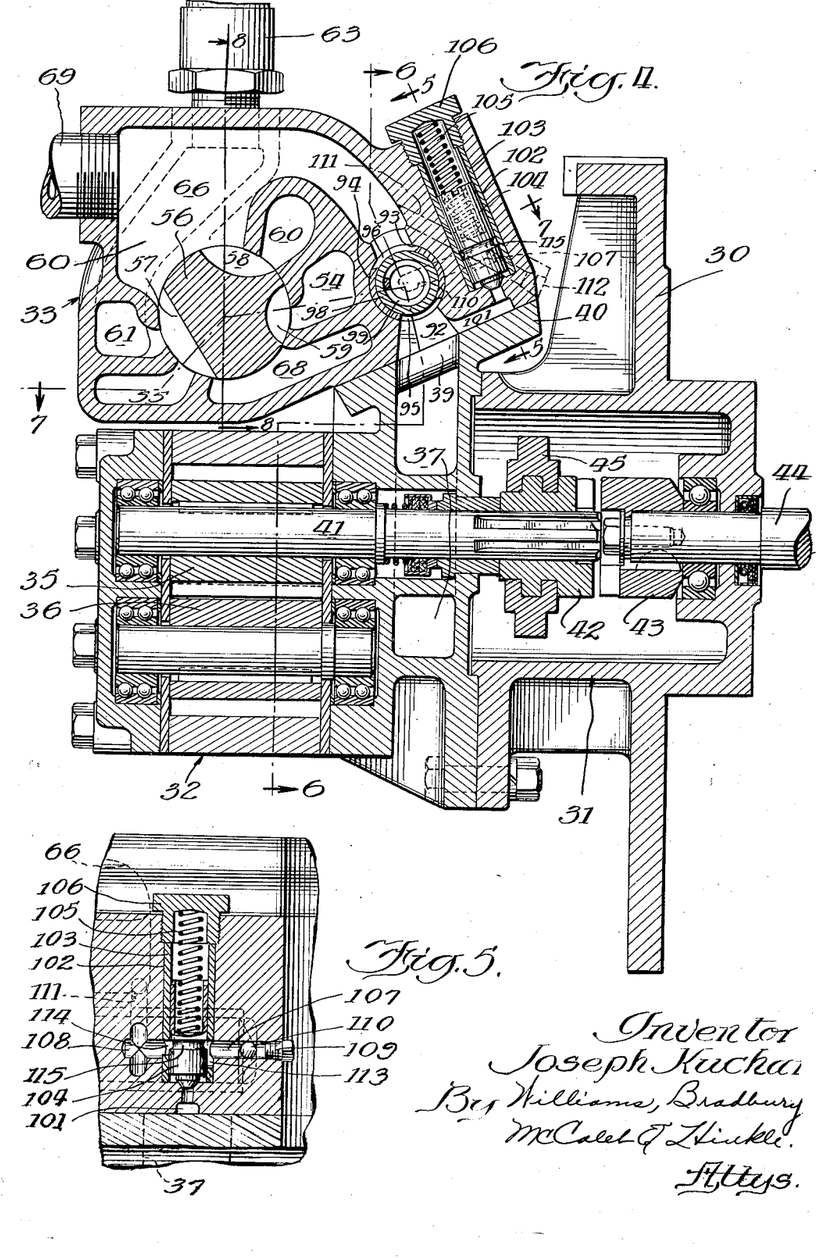
Fig. 4 is a sectional view therethrough taken on the line 4—4 of Fig. 3.
Fig. 5 is a sectional detail view taken on the line 5—5 of Fig. 4.

The pump and valve unit may suitably be mounted on the rear end of the tractor 20 and may comprise a tank 28 which serves as a reservoir for pressure liquid such as oil. The tank 28 is supported by brackets 29 which are mounted on the face plate 30 which carries the clutch housing 31. The pump, which is designated generally by the reference numeral 32 is secured to the clutch housing 31 and the valve by-pass unit, which is designated generally by the reference numeral 33, is mounted upon the upper end of the pump housing. The three elements 31, 32 and 33 are best seen in Fig. 4. The combined unit including the tank 28 is secured upon the rear end of the tractor 20 by means of the face plate 30 as shown in Figs. 1 and 2.

The tank 28 is connected by means of a pipe 34 with the inlet side of the pump 32, which may suitably be a gear pump comprising gears 35 and 36. The outlet side of the pump connects with a chamber 37 which is adapted to discharge through openings 38 and 39 in a flange 40 upon which the valve unit 33 is mounted. The gears 35 and 36 are driven by the spindle 41 upon which the gear 35 is keyed. This spindle projects into the clutch housing 31 and its end is splined so as to carry the clutch element 42. The clutch element 42 is adapted to be slid longitudinally of the shaft 41 so as to engage the clutch element 43 carried by the drive shaft 44 which may be driven in any suitable way, for example from the transmission of the tractor.

Figures 7, 8:
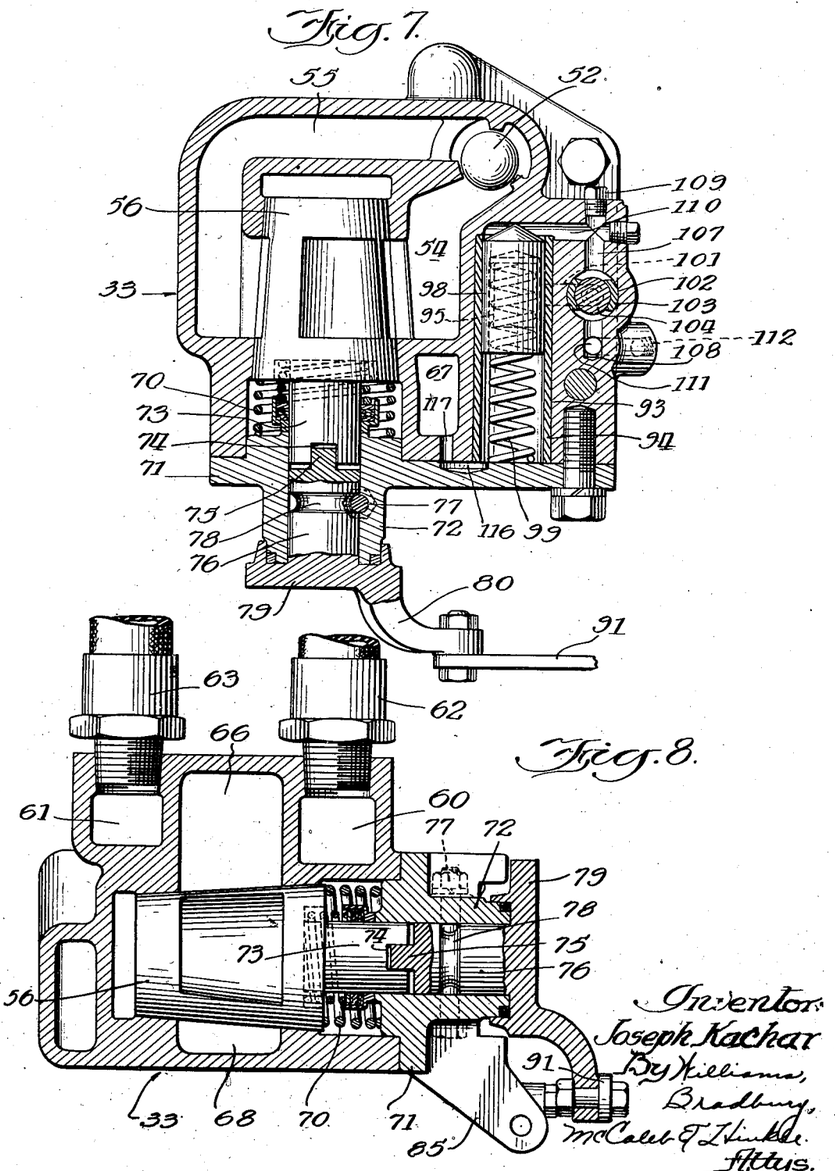
Fig. 7 is a sectional view taken on the line 7—7 of Fig. 4.
Fig. 8 is a sectional view through the line 8—8 of Fig. 4.
Figure 9:
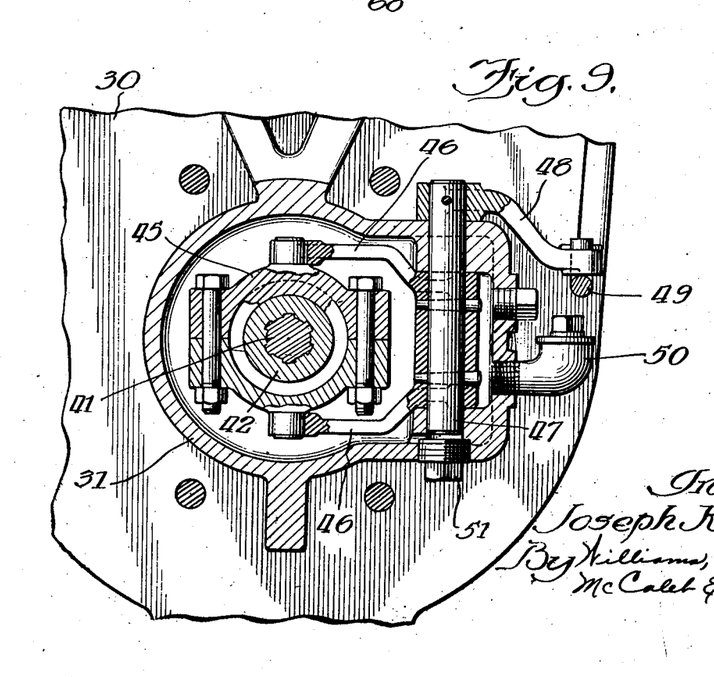
Fig. 9 is a sectional detail view taken on the line 9—9 of Fig. 2.
Figures 10, 11:
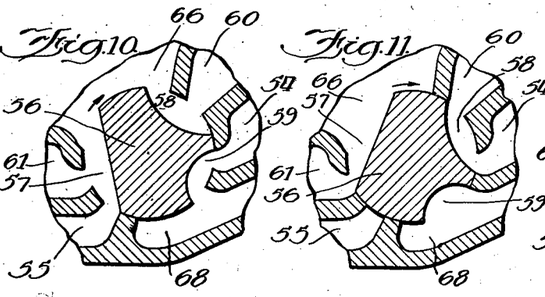
Figs. 10, 11, 12 and 13 are diagrammatic sectional views taken through the manually operated valve and illustrating the manner in which that valve controls the discharge of pressure fluid from the pump.
Figure 12:
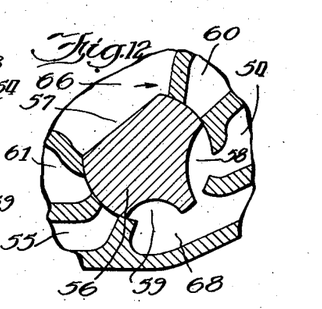
Figure 13:
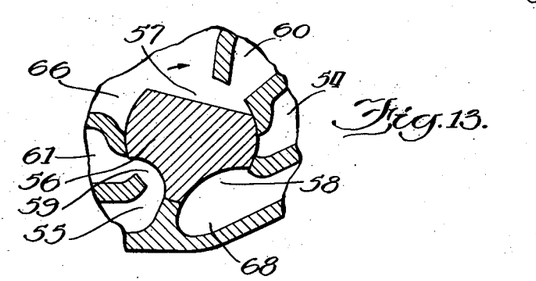

The clutch member 42 carries a slip ring 45 which is adapted to be actuated by the slotted ends of arms 46 rigidly carried by a spindle 47, which is pivotally mounted in one side of the clutch housing 31. The upper end of the spindle 47 projects out of the housing and rigidly carries an arm 48. To the arm 48 is pivotally connected a rod 49 which is actuated in a manner hereinafter described in order to connect and disconnect the pump drive. The clutch housing 31 is provided with an inlet 50 whereby lubricant may be introduced into the housing and a drain opening 51 whereby the housing can be drained. The opening 38 in the flange 40 is closed by a ball valve 52 under the action of a spring 53 which is housed within the valve by-pass unit. The pressure fluid supplied by the pump is adapted to open the valve 52 and the pressure liquid is discharged into ducts 54 and 55, which are best shown in Fig. 7 and also in the diagrammatic Figures 10 to 13. These ducts 54 and 55 terminate in a conical seat in which is located the valve plug 56. The valve plug 56 is provided with cut away portions 57, 58 and 59 whereby various ducts, including the ducts 54 and 55, may be put into communication in various ways to control the operation of the desired cylinders. These ducts will now be referred to. Adjacent the terminations of the ducts 54 and 55 and above same, ducts 60 and 61 terminate in cooperative relation to the valve plug 56. The ducts 60 and 61 communicate with outlet conduits 62 and 63 respectively. These outlet conduits are connected by means of flexible hoses 64 and 65 with the pressure lines 25 and 27 which actuate the cylinders 24 and 26 respectively. Between and above the ducts 60 and 61 the valve plug 56 communicates with a low pressure chamber 66 which communicates through a duct 67 with a low pressure chamber 68, which is open to the valve plug 56 between the high pressure ducts 54 and 55. The low pressure chambers 66 and 68 communicate through a discharge outlet 69 with the tank 28.

The plug 56 is held in its conical seat by means of a spring 70 which abuts against a cover plate 71 of the valve by-pass unit 33. The cover plate 71 carries a boss 72 which receives a stem 73 of the plug 56. The outer end of the stem 73 is provided with a slot 74 which is adapted to receive a rib 75 carried at the inner end of a stem 76. The stem 76 is received in the boss 72 and is held therein by means of a screw 77 which is received in an annular groove 78 in the stem 76. At this outer end the stem 76 carries a plate 79 and an arm 80. As shown in Fig. 2, the plate 79 is provided around its edge with cam surfaces which are adapted to be engaged by a cam roller 81 carried on a lever 82 which is pivotally mounted adjacent its center on the cover plate 71. At its lower end the lever 82 is pivotally connected to a collar 83 which is rigidly mounted in adjustable position upon the rod 49. The rod 49 extends beyond the collar 83 and a spring 84 is mounted on the rod and abuts against the collar 83 and against an abutment guide 85 which may be integral with the cover plate 71. It will readily be understood that the spring 84 normally tends to force the clutch members 42 and 43 out of engagement so as to terminate the drive of the pump 32. In the position of the valve plate 79 the drive of the pump is interrupted. When, however, the valve plate 79 is rotated in clockwise direction, the roller 81 rides up a cam rise immediately the clutch members are moved into engagement.

The movement of the valve plug 56 and plate 79 is controlled by a hand lever 86 located convenient to the driver of the tractor. The hand lever 86 is provided with a spring detent 87 which is adapted to engage notches 9, 10, 11, 12 and 13 on a rigid sector. The reference numerals 10, 11, 12 and 13 given to the notches correspond with Figs. 10, 11, 12 and 13, which illustrate the corresponding positions of the valve plug 56. When the hand lever 86 occupies these various positions the hand lever 86 is connected by a link 89 which is pivotally connected to a short lever 90 pivotally mounted on one of the brackets 29. One end of the lever 90 is connected by a link 91 to the arm 80 so that for each movement of the hand lever 86 a corresponding rotation of the valve plug 56 occurs.

The opening 39 registers with an opening 92 which opens into a side of a horizontal, cylindrical bore 93 into which is inserted a sleeve 94 provided with opposite openings 95 and 96. The opening 96 communicates through a port 97 with the low pressure chamber 66. The sleeve 94 receives a hollow piston valve 98 which is adapted to be pressed inwardly by a spring 99 which abuts against a cover plate 71, so as to interrupt the passage between the high pressure port 39 of the pump and the low pressure chamber 66 of the valve by-pass unit 33. The inner end of the piston valve 98 is of conical formation for a purpose which will hereinafter be described.

The port 92 communicates with a small duct 101 which communicates with the inner end of a bore 102 which is also provided with a liner 103. A piston valve 104 is located within the liner 103 and is adapted to be pressed inwardly by a spring 105. The pressure on the spring 105 can be adjusted by means of a cap 106 which is threaded into the outer threaded end of the bore 102. The ducts 107 and 108 extend into the bore 102 at opposite sides thereof. These ducts may be drilled simultaneously since they are in alignment and the outer end of the duct 107 may be closed by a plug 109. The duct 107 communicates through a duct 110 with the inner end of the bore 93. The duct 108 communicates with a duct 111 which is shown in dot-and-dash lines in Fig. 4 to extend from the exterior of the casting into the low pressure chamber 66 of the valve by-pass unit 33. The outer end of the duct 111 is closed by a plug 112. The sleeve 103 is provided with openings 113 and 114 in alignment with the ducts 107 and 108. The opening 113 is substantially longer than the opening 114 in the longitudinal direction of the sleeve 103. The valve 104 is provided with a peripheral groove 115, which in the normal closed position of the valve 104 is in alignment with the openings 113 and 114 so that it establishes communication between the ducts 107 and 108.

The cover plate 71 is provided on its inner side with a recess 116 which extends over the sleeve 94 so as to communicate to the inside thereof behind the piston valve 98. The recess 116 also extends over a duct 117 which communicates with the low pressure duct 67. The passageway thus formed enables the fluid back of the piston valve 98 to be displaced during the operation of the device, as will hereinafter appear.

When the hand lever 86 is in position 9, the valve plate 79 is in the position shown in Fig. 2 and the clutch members 42 and 43 are disengaged. When however the hand lever 86 is moved into the position 10 the lever 82 is swung by the cam surface on the valve plate 79 so as to move the clutch member 42 into engagement with the clutch member 43, thereby starting the pump, it being assumed that the tractor engine is running. This same movement locates the valve plug 56 in the manner shown in Fig. 10, that is the duct is in communication with the low pressure chamber 66 by means of the cut out portion 58 and the ducts 55 and 61 are in free communication through the cut out portion 57. The duct 54 is in free communication with the duct 55 so that the valve is in a completely open or neutral position and circulation effected by the pump is delivered by the duct 55 to the low pressure chamber 66 from whence it returns to the tank 28, through the discharge outlet 69. In other words, the circulation by-passes through the valve 56. When however the hand lever 86 is moved forwardly to position 11 the valve 56 is rotated into the position shown in Fig. 11. In this position the high pressure duct 55 is closed and the high pressure duct 54 is put into communication with duct 60, by means of the cut out portion 58. It will readily be seen that the pressure fluid supplied by the pump is now forced through the duct 60 to the cylinder 24, forcing the cylinder outwardly to accomplish its function, which in the specific instance illustrated, is the unlatching of the doors 23. When the cylinder 24 is filled, the pressure rises and the pump must be immediately by-passed in order to save damage to the machine. This by-passing will now be described.

Figure 6:
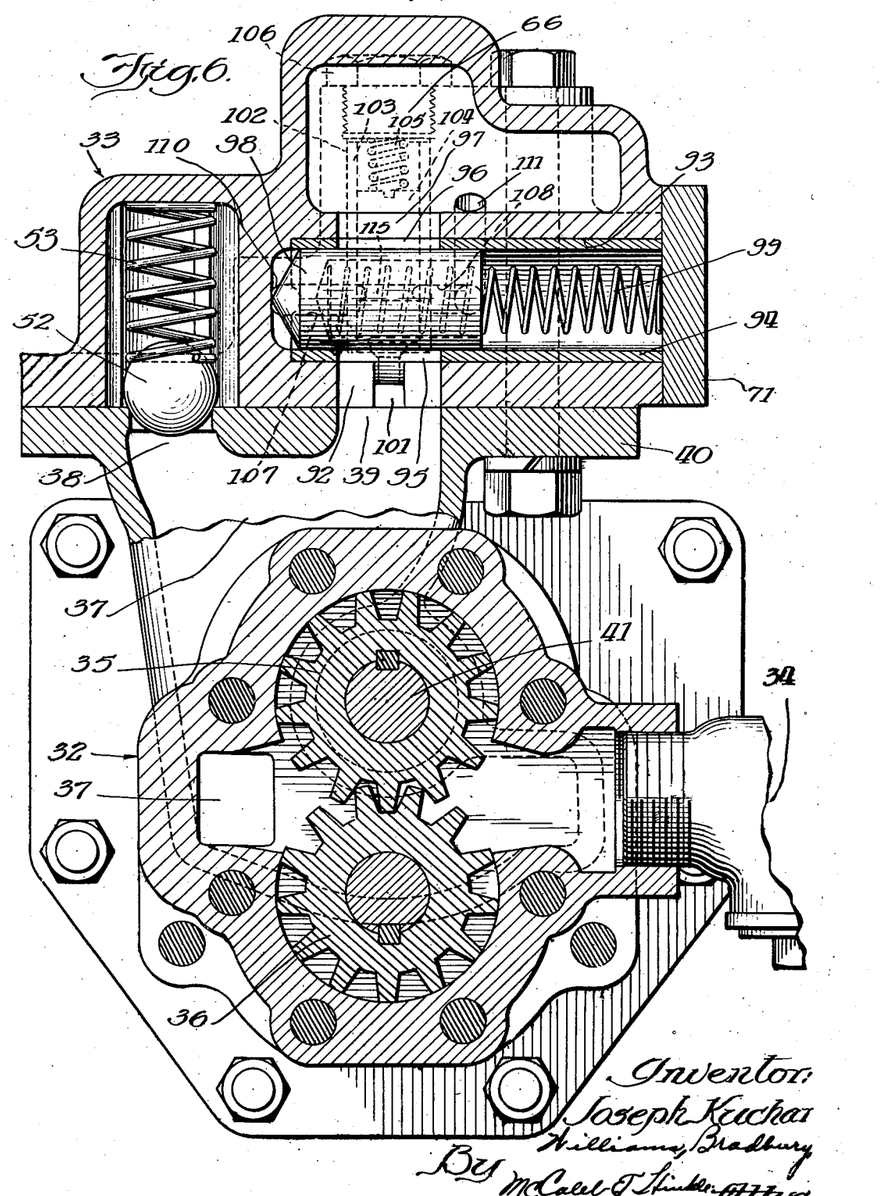
Fig. 6 is a further sectional view taken on the line 6—6 of Fig. 4.

The pressure on the high pressure side of the pump is communicated through the duct 101 to the face of the piston valve 104. When this pressure rises above its normal maximum, which occurs when the cylinder 24 is full, the piston valve 104 is pressed upwardly, as viewed in Figs. 4 and 5, against the action of the spring 105. The actuating pressure can, of course, be adjusted by adjusting spring 105 by means of the nut 106 or by replacing the spring by another one having the desired strength. When the piston valve 104 is moved upwardly sufficiently the pressure fluid discharged by the pump is admitted through the opening 113, ducts 107 and 110 to the underside of piston valve 98. The upward movement of the piston valve 104 moves the groove 115 past the openings 113 and 114 so that communication between the ducts 107 and 108 is shut off. The piston valve 98 is consequently forced to the right as viewed in Fig. 6 until it uncovers the openings 95 and 96. This immediately provides a by-pass between the high pressure discharge chamber 37 of the pump and the low pressure chamber 66, through which the fluid rushes, the flow forcing the piston valve 98 to the right against the action of the spring 99. The fluid back of the piston 98 passes through the recess 77 and duct 117 into low pressure duct 67. The spring 99 is of such strength that the flow of fluid passing through the openings 95 and 96 is able to keep it open. This condition exists until the hand lever 86 is again actuated. If the hand lever 86 is moved into position 12 the valve 56 closes the duct 60 so that the cylinder 24 is maintained full of fluid, which condition is maintained, for example if the engine is stopped or used for other purposes, for example pumping fluid to other cylinders by means of another distributing valve similar to 56. When the hand lever 86 is moved into position 12, a by-pass relationship is created between high pressure duct 54 and low pressure duct 68, thereby by-passing the pump while holding the cylinder 24 full of liquid.

When the hand lever 86 is moved to position 13 the high pressure duct 55 is put into communication with duct 61 through the cut out portion 59 so that the cylinder 26 is actuated. At this time the cylinder 24 is permitted to return its fluid through duct 60, and cut out portion 57, to the tank 28.

When the hand lever 86 is moved back to position 12, the cylinder 26 may be maintained full of liquid in the manner above described with reference to cylinder 24. It is to be noted that when the hand lever 86 is further returned to position 11 the cylinder 26 may return its fluid through duct 61 and cut out portion 57.

The operation of the device will more readily be understood from the following description of typical operation of the embodiment illustrated. Referring to Fig. 1, the doors 23 are closed, the cylinders 26 are full of pressure fluid, the same being maintained therein due to the fact that valve 56 is in the holding position shown in Fig. 12. The cylinder 24 is empty and the latch is closed by a spring associated therewith. The pump is working but is by-passed through cut out portion 58 which extends between the high pressure duct 54 and the low pressure duct 68. It is assumed that the loaded wagon is brought to a position where the load is to be dumped. The hand lever 86 is moved into position 11 and high pressure fluid is supplied to the cylinder 24 in the manner described above thus releasing the latch. The weight of the load opens the doors 23 actuating the pistons of the cylinders 26 so as to return the pressure fluid in the cylinder to the tank 28 through the duct 61, the same being in communication with the low pressure chamber 66 through the cut out portion 57.

In the ordinary use of the machine the operator will not actuate the hand lever 86 immediately the cylinder 24 becomes filled. Consequently the pressure builds up the pressure side of the pump and the valve 98 is opened in the manner described above. In order to return the valve 98 to its closed position it is necessary to move the valve 56 into a by-pass position. For example into position 10 or 12, that is the neutral or holding position. In the first case the high pressure duct 55 is in free communication with the low pressure chamber 66 through the cut out portion 57. In the latter case the high pressure duct 54 is in free communication with the low pressure chamber 68 through cut out portion 58. Whenever either of these by-passes is established the flow through the openings 95 and 96 is diminished so that its tendency to maintain the valve 98 open is reduced. The spring 99 consequently is able to close the valve 98. In the present example it is assumed that the by-pass is established by moving the lever 86 to the position 12. The load has now been dumped and it is necessary to close the doors 23. This is effected by moving the hand lever 86 to the position 13 which causes the pump to supply pressure fluid to the cylinder 26 through duct 55, cut out portion 59 and duct 61. When the doors are elevated the latch is operated and holds the doors in position until the cylinder 24 is again supplied with pressure fluid.

While I have shown a single valve 56 controlling two cylinders 24 and 26, it will be obvious that I may modify this valve 56 and the associated ducts so as to take care of a larger number of cylinders. It will also readily be understood that I may provide a plurality of valves of the same type as 56 so as to multiply the number of cylinders which may be actuated from a single pump. In the latter case the valve 56 may be modified so as to provide a position at which the supply of high pressure fluid may be completely cut off, or an independent valve may be provided so that the supply of pressure fluid to each valve 56 may be turned off or on at will.

Although the invention has been described in connection with specific details of a preferred embodiment thereof, it must be understood that such details are not intended to be limitative of the invention except insofar as set forth in the accompanying claims.

Having thus described my invention, what I claim as new and desire to secure by Letters Patent of the United States is:

1. In combination, a by-pass valve adapted to withstand working pressures, means adapted automatically to open said by-pass valve when a predetermined pressure is attained on the pressure side, said by-pass being arranged to permit a flow with substantially no pressure loss and to keep open by said flow, a manually operable by-pass valve in parallel with the automatic by-pass valve, and means tending to close the automatic by-pass valve, the capacity of the manually operable by-pass being such that its opening reduces the aforesaid flow to a degree insufficient to keep the first said by-pass valve open.

2. A by-pass control for pressure fluid comprising an automatic by-pass valve adapted to withstand working pressures and tending normally to close, means controlled by predetermined pressure adapted to open said by-pass valve, said by-pass valve being arranged to be held open by the by-pass flow therethrough with slight loss of pressure in the by-passing stream, and a by-pass valve in parallel with the automatic by-pass valve, the means normally tending to close the automatic by-pass valve being such that it is effective to close the same when the second by-pass valve is opened and the flow through the first by-pass valve is thereby substantially reduced.

3. A by-pass control for pressure fluid comprising a channel through which the by-pass fluid is adapted to flow, a piston valve adapted to operate transversely to said channel to open and close same, said piston valve being biased so as normally to tend to close, and having an end arranged to be actuated by the by-pass flow so as to remain open, a pressure actuated valve adapted to admit fluid to the underside of the piston to effect the opening of the piston valve when predetermined pressure is attained, a channel in parallel with the first said channel, and an operated valve controlling the second channel, the means biasing the piston valve being arranged to effect the closing thereof when the flow through the first said channel is reduced by the opening of the operated valve.

4. In combination, a by-pass, a by-pass valve member adapted to close the by-pass, means adapted to admit pressure fluid to one end of the by-pass valve member when a predetermined pressure is attained on the pressure side of said member, said member being adapted to be moved towards open position by said pressure and being arranged to be maintained open by the by-passing stream without substantial loss of pressure, and a second by-pass in parallel with the first said by-pass, the by-pass valve member being arranged to close when the stream through the first said by-pass is reduced on the opening of the second said by-pass.

5. In combination, a by-pass, a by-pass valve member adapted to close the by-pass, means adapted to admit pressure fluid to one end of the by-pass valve member when a predetermined pressure is attained on the pressure side of said member, said member being adapted to be moved towards open position by said pressure and its said end being configured so that the by-passing stream maintains said member in open position without substantial pressure drop, and a second by-pass in parallel with the first said by-pass, the by-pass valve member being arranged to close when the stream through the first said by-pass is reduced on the opening of the second said by-pass.

6. A by-pass control for pressure fluid comprising a channel through which the by-pass fluid is adapted to flow, a piston valve adapted to operate transversely to said channel to open and close same, a spring tending to maintain said piston valve closed, said piston valve having an end arranged to be actuated by the by-pass flow so as to remain open when fluid is passing therethrough, a pressure actuated valve adapted to admit fluid to the underside of the piston to effect the opening of the piston valve when predetermined pressure is attained, a channel in parallel with the first said channel, and an operated valve controlling the second said channel, the spring being arranged to effect the closing of the piston valve when said flow is substantially reduced by the opening of the operated valve.

7. A by-pass control for pressure fluid comprising a channel through which the by-pass fluid is adapted to flow, a piston valve adapted to operate transversely to said channel to open and close same, a spring tending to maintain said piston valve closed, said piston valve having a coned end adapted to be actuated by the by-pass flow so as to remain open when fluid is passing therethrough, a pressure actuated valve adapted to admit fluid to the underside of the piston to effect the opening of the piston valve when predetermined pressure is attained, a channel in parallel with the first said channel, and an operated valve controlling the second said channel, the spring being arranged to effect the closing of the piston valve when said flow is substantially reduced by the opening of the operated valve.

8. In combination, a fluid pump, an automatic by-pass valve therefor, an operated distributing valve adapted to establish a by-pass in parallel with said automatic by-pass valve, said automatic by-pass valve being adapted to permit fluid to pass without substantial drop of pressure, automatic means adapted to permit the by-pass valve to open when a predetermined pressure is attained, and means tending to close said automatic by-pass valve and operative to close said valve when the flow of liquid therethrough is substantially reduced.

9. In combination, a fluid pump, an automatic by-pass valve therefor, an operated distributing valve adapted to establish a by-pass in parallel with said automatic by-pass valve, said automatic by-pass valve being arranged to permit fluid to pass without substantial drop of pressure, a spring pressed valve adapted to admit fluid to open said automatic by-pass valve when a predetermined pressure is attained, and a spring tending to close said automatic by-pass valve and operative to close said valve when the flow of liquid therethrough is substantially reduced.

10. In combination, a fluid pump, an automatic by-pass valve therefor, an operated distributing valve adapted to establish a by-pass in parallel with said automatic by-pass valve, a spring pressed valve adapted to admit fluid to open said automatic by-pass valve when a predetermined pressure is attained, and a spring tending to close said automatic by-pass valve, said automatic by-pass valve being configured so that substantial flow maintains the valve open against the spring, the spring closing the valve when the flow is substantially reduced.

11. In combination, a fluid pump, an automatic by-pass valve therefor, a pressure operated device adapted to be supplied with pressure fluid from said pump, an operated distributing valve adapted to open and close connection between said pump and device and adapted to open a by-pass in parallel with the first said by-pass valve, and pressure controlled means adapted to admit fluid to open said automatic by-pass valve when a predetermined pressure is attained, said by-pass valve being arranged to be maintained open by a substantial flow and being adapted to close when the flow is reduced.

12. In combination, a fluid pump, an automatic by-pass valve therefor, a pressure operated device adapted to be supplied with pressure fluid from said pump, an operated distributing valve adapted to open and close connection between the pressure device and the high pressure side of said pump and between the pressure device and the low pressure side of said pump and to by-pass from the high to the low pressure side of the pump, and pressure controlled means adapted to admit fluid to open said automatic by-pass valve when a predetermined pressure is attained, said by-pass valve being arranged to be maintained open by a substantial flow and being adapted to close when the flow is reduced.

13. In combination, a fluid pump, an automatic by-pass valve therefor, a plurality of pressure operated devices adapted to be supplied with pressure fluid from said pump, an operated distributing valve adapted to open and close connection between each of said devices and said pump and adapted to open a by-pass in parallel with the first said by-pass valve, and pressure controlled means adapted to admit fluid to open said automatic by-pass valve when a predetermined pressure is attained, said by-pass valve being arranged to be maintained open by a substantial flow and being adapted to close when the flow is reduced.

14. In combination, a fluid pump, an automatic by-pass valve therefor, a plurality of pressure operated devices adapted to be supplied with pressure fluid from said pump, an operated distributing valve adapted to open and close connection between the pressure devices and the high pressure side of said pump and between the pressure devices and the low pressure side of said pump, and to by-pass from the high to the low pressure side of said pump, and pressure controlled means adapted to admit fluid to open said automatic by-pass valve when a predetermined pressure is attained, said by-pass valve being arranged to be maintained open by a substantial flow and being adapted to close when the flow is reduced.

JOSEPH KUCHAR.